United States Patent
Sukegawa et al.

(10) Patent No.: US 9,715,049 B2
(45) Date of Patent: Jul. 25, 2017

(54) METHOD OF MANUFACTURING A DIFFRACTION GRATING

(71) Applicant: CANON KABUSHIKI KAISHA, Tokyo (JP)

(72) Inventors: Takashi Sukegawa, Utsunomiya (JP); Shigeru Sugiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 13/922,084

(22) Filed: Jun. 19, 2013

(65) Prior Publication Data

US 2013/0342909 A1 Dec. 26, 2013

(30) Foreign Application Priority Data

Jun. 20, 2012 (JP) ................. 2012-138391

(51) Int. Cl.
*G02B 5/18* (2006.01)
*G02B 1/02* (2006.01)

(52) U.S. Cl.
CPC .......... *G02B 5/1852* (2013.01); *G02B 1/02* (2013.01); *G02B 5/1861* (2013.01); *G02B 5/1814* (2013.01)

(58) Field of Classification Search
CPC ........ G02B 19/0042; G02B 1/02; G02B 1/06; G02B 1/10; G02B 1/105; G02B 1/115; G02B 2003/0093; G02B 2006/12107; G02B 21/244; G02B 21/245; G02B 21/361; G02B 23/2461; G02B 26/0808; G02B 26/0833
USPC ............................................ 359/1, 569, 571
See application file for complete search history.

(56) References Cited

U.S. PATENT DOCUMENTS

| 4,475,792 A | 10/1984 | Sica, Jr. | |
| 6,490,393 B1 * | 12/2002 | Zhou | G02B 6/12002 359/571 |
| 2004/0156108 A1 * | 8/2004 | Chou | B29C 33/60 359/566 |

FOREIGN PATENT DOCUMENTS

| JP | 55134806 A | * | 10/1980 |
| JP | 2002-202454 A | | 7/2002 |
| JP | 2002-214420 A | | 7/2002 |
| JP | 2003-075622 | * | 12/2002 |

(Continued)

OTHER PUBLICATIONS

Naoto Kobayashi, "Zinc sulfide and zinc selenide immersion gratings for astronomical high-resolution spectroscopy: evaluation of internal attenuation of bulk materials in the short near-infrared region", Optical Engineering, vol. 48(8), pp. 084001-1-084001-9, Aug. 2009.*

(Continued)

*Primary Examiner* — Scott J Sugarman
*Assistant Examiner* — Sharrief Broome
(74) *Attorney, Agent, or Firm* — Canon U.S.A., Inc. IP Division

(57) ABSTRACT

A method for manufacturing a blazed diffraction grating made of a crystalline material comprising zinc selenide (ZnSe) or zinc sulfide (ZnS) includes forming the blazed diffraction grating by forming a plurality of grating grooves on a machined surface of a workpiece by machining, wherein the grating grooves are formed so that a surface comprising a (110) plane is arranged to receive the most incident light among the surfaces that constitute each grating, where (110) describes a crystal orientation of the crystalline material.

16 Claims, 6 Drawing Sheets

(56) References Cited

FOREIGN PATENT DOCUMENTS

| JP | 2003-075622 A | 3/2003 |
|---|---|---|
| JP | 2003-295052 A | 10/2003 |
| JP | 2004-317693 A | 11/2004 |
| JP | 2006-047343 A | 2/2006 |
| JP | 2007-164013 A | 6/2007 |
| JP | 05864920 B2 | 2/2016 |

OTHER PUBLICATIONS

I JP 55134806 A, Fuji—Original and English translation.*
Paul J. Kuzmenko et al., "Fabrication and testing of diamond-machined gratings in ZnSe, GaP, and bismuth germanate for the near infrared and visible", Proc. of SPIE vol. 7018, pp. 70184Q-1-70184Q-12, (2008).
Marsh, J. P., et al., "Production and evaluation of silicon immersion gratings for infrared astronomy", Applied Optics, vol. 46, No. 17, Jun. 10, 2007, pp. 3400-3416.
Naoto Kobayashi, "Zinc sulfide and zinc selenide immersion gratings for astronomical high-resolution spectroscopy: evaluation of internal attentuation of bulk materials in the short near-infrared region", Optical Engineering, vol. 48(8), pp. 084001-1-084001-9, Aug. 2009.

* cited by examiner

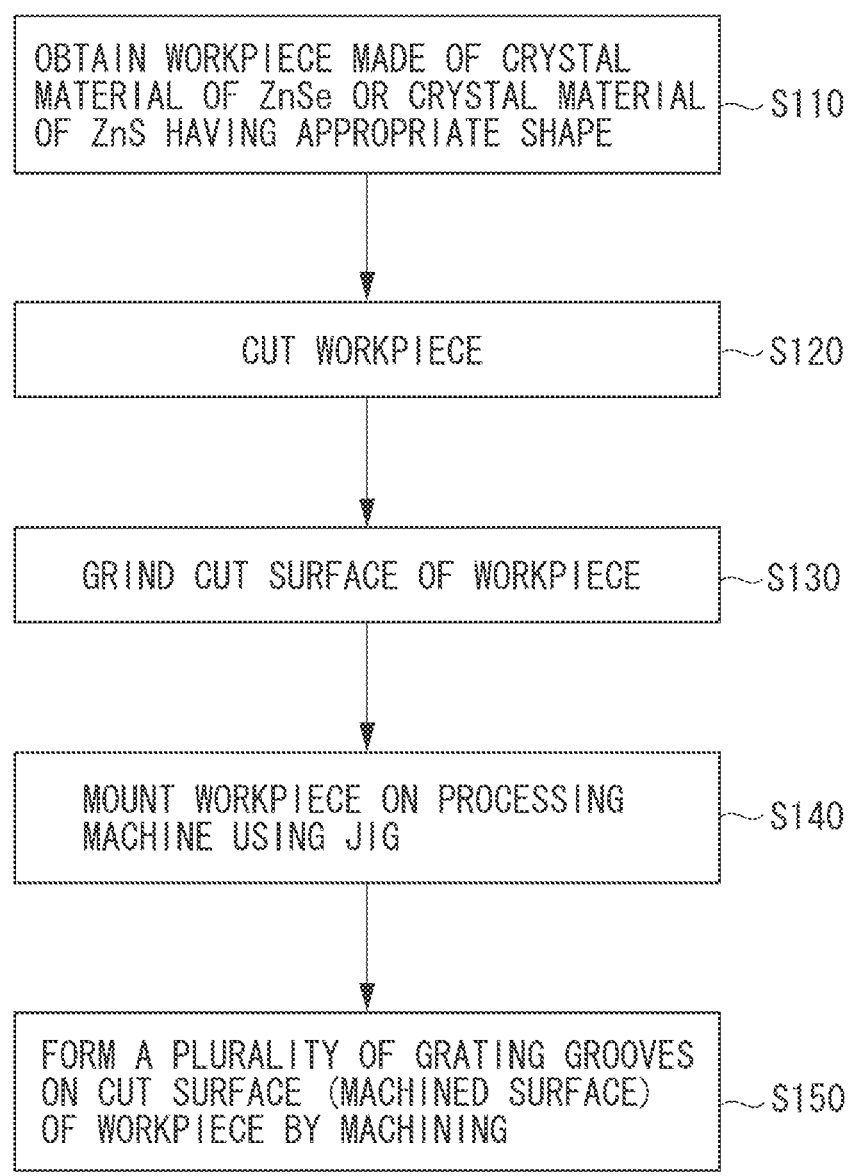

METHOD OF MANUFACTURING A DIFFRACTION GRATING

BACKGROUND OF THE INVENTION

Field of the Invention

The present invention relates to a method of manufacturing a diffraction grating. Such a diffraction grating may be used, for example, in an optical apparatus such as a spectroscope.

Description of the Related Art

A phase diffraction grating is a diffraction grating made so that a phase difference is given to incident light in one cycle of grating by making the shape of a grating groove into a blazed shape, a sinusoidal shape, or a rectangular wave shape so that a diffraction light intensity property can be selected according to its use. A blazed diffraction grating is a phase diffraction grating having a grating groove with a triangular cross-section, and is manufactured by sequentially forming a ruling, a the grating groove of a predetermined cross-sectional shape, by a cutting process using a grind stone or a shaving process using a diamond cutting tool.

A blazed diffraction grating made of a crystalline material is a diffraction grating designed to use high-order diffraction light. In order to obtain good optical properties, it is necessary that the machining in which the grating groove is formed is performed in a ductile mode. A critical cutting thickness determines the boundary between the ductile mode and a brittle mode. It is known that the critical cutting thickness depends on a relation between a crystal orientation of a slip surface and a worked surface, a relation between a crystal axis and a cutting direction, and a relation between the crystal axis and a cutting force direction (which depends on a tool rake angle and the cutting direction) in a crystal. For example, Japanese Patent Application Laid-Open No. 2003-075622 discusses that the grating groove is formed by using a groove processing surface (a surface on which the grating groove is to be formed) as a (111) plane, using a cutting direction as a (111) plane in a crystalline material made of Si or Ge, and using a single crystal diamond cutting tool in an ultra-precision cutting process.

However, a stable ductile mode is not obtained even when the crystal orientation (plane direction of crystal) of the groove processing surface (diffraction grating plain surface) and the critical cutting thickness are used as parameters. The blazed diffraction grating is influenced by at least one of the long side and the short side that constitute the grating groove when used as a transmission type or an immersion type (backside reflection type) diffraction grating. However, it is common to use the blazed diffraction grating so that the incident direction of light is perpendicular to the short side of the cross-sectional shape of the grating. The surface roughness (profile irregularity) of the short side is important, for example, in the case of a reflection diffraction grating.

The crystalline materials made of zinc selenide (ZnSe) or zinc sulfide (ZnS) are used as optical materials, but there is no conventional way of machining the grating groove of a blazed diffraction grating from these crystalline materials.

SUMMARY OF THE INVENTION

According to an aspect of the present invention, a method for manufacturing a blazed diffraction grating made of a crystalline material comprising zinc selenide (ZnSe) or zinc sulfide (ZnS) includes forming the blazed diffraction grating by forming a plurality of grating grooves on a machined surface of a workpiece by machining, wherein the grating grooves are formed so that a surface comprising a (110) plane is arranged to receive the most incident light among the surfaces that constitute each grating, where (110) describes a crystal orientation of the crystalline material.

According to another aspect of the present invention, a method for manufacturing a blazed diffraction grating made of a crystalline material of zinc selenide (ZnSe) or zinc sulfide (ZnS) includes forming the blazed diffraction grating by forming a plurality of grating grooves on a machined surface of a workpiece by machining, wherein the grating groove is formed so that a surface having a short side of a triangular cross-sectional shape of each grating groove is a (110) plane, where (110) describes a crystal orientation of the crystalline material.

Further features of the present invention will become apparent from the following description of exemplary embodiments with reference to the attached drawings.

BRIEF DESCRIPTION OF THE DRAWINGS

FIG. 4 is a flowchart illustrating the method of manufacturing the blazed diffraction grating illustrated in FIG. 1.

DESCRIPTION OF THE EMBODIMENTS

Figure 1:
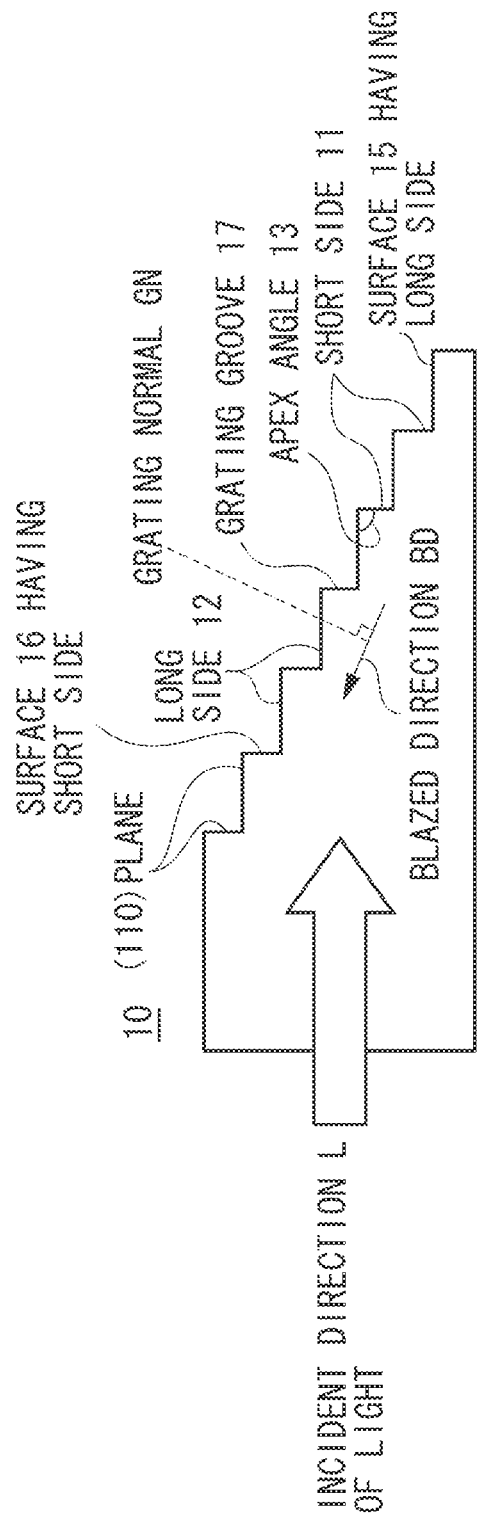
FIG. 1 is a schematic cross-sectional view illustrating a blazed diffraction grating according to an embodiment of the present invention.

FIG. 1 is a schematic cross-sectional view illustrating a blazed diffraction grating (also known as an Echelle diffraction grating) 10 that diffracts incident light. The blazed diffraction grating is a diffraction grating in which a grating groove has a saw tooth shape (blazed shape), and has a high diffraction efficiency for a specific order and wavelength. The blazed diffraction grating of the present embodiment is an immersion diffraction grating (transmission type, backside reflection diffraction grating) as illustrated in FIG. 1. However, the blazed diffraction grating 10 may alternatively be configured as a reflection diffraction grating that reflects the light on its front surface.

Each grating of the blazed diffraction grating 10 has an asymmetric triangular shape composed of a short side 11 and a long side 12 in a cross-section including a blazed direction BD and a grating normal GN perpendicular thereto. The short side 11 and the long side 12 each also extend in a direction perpendicular to the plane of the page in FIG. 1.

An angle $\theta$ made by the short side 11 and the long side 12 is referred to as an apex angle 13, which is $\theta=90°$ in the present embodiment. The apex angle 13 is approximately equal to an opening angle $\theta 1$ of a tip portion of a cutting tool described below. In the blazed diffraction grating 10 of the present embodiment, a surface 16 having the short side 11 works as a blazed plane that receives the most incident light and a surface 15 having the long side 12 works a counter plane adjacent to the blazed plane among the surfaces that constitute each grating. However, in the reflection blazed diffraction grating, the surface 15 may work as the blazed plane and the surface 16 may work as the counter plane in some cases. The present invention is also applicable to the case where each grating does not have the triangular shape in the cross-section including the blazed direction BD and the grating normal perpendicular thereto.

As illustrated in FIG. 1, the blazed diffraction grating 10 is often used in a configuration so that the incident light direction L of the light faces the short side in order to resolve the incident light frequently as possible, and the diffraction efficiency depends on the surface accuracy (profile irregularity) of the short side 11. Thus, it is required to process the surface 16 including the short side 11 with high precision.

Figure 2:
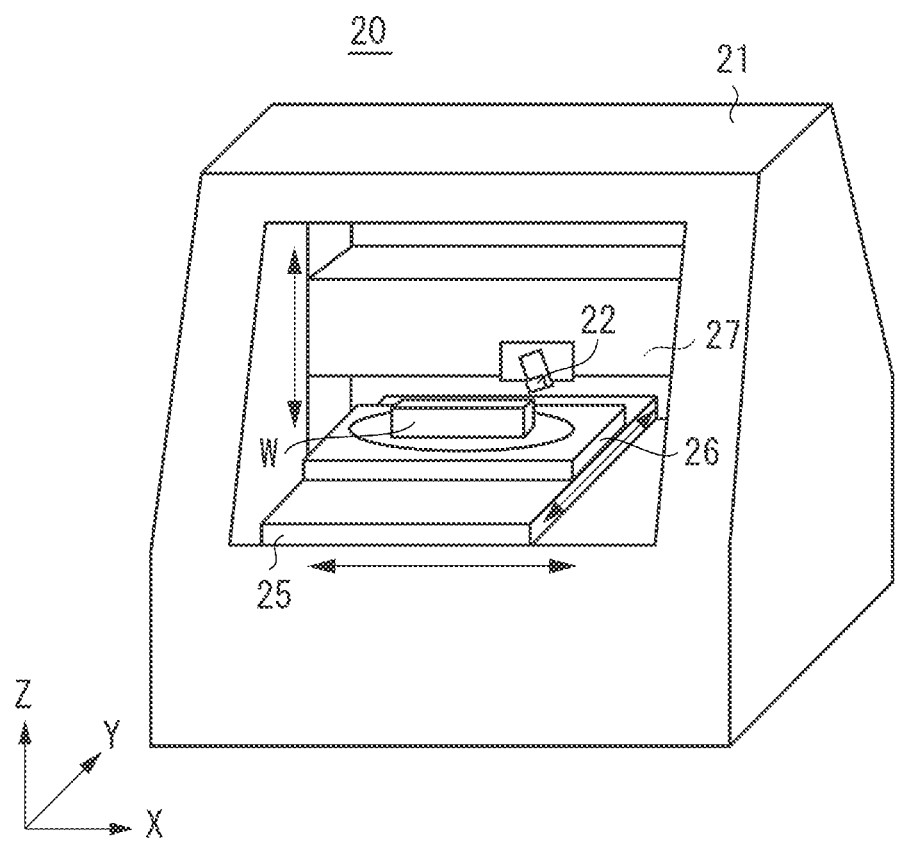
FIG. 2 is a schematic perspective view illustrating a processing machine according to the embodiment of the present invention.

FIG. 2 is a schematic perspective view of a processing machine 20 of the present embodiment, and X, Y and Z are set for three axis directions that are orthogonal to one another. The processing machine 20 is a manufacture apparatus that manufactures the blazed diffraction grating 10 by forming a plurality of grating grooves 17 on the workpiece W made of a ZnSe crystalline material or a ZnS crystalline material. The ZnSe crystalline material transmits the light from visible light of 0.5 to 22 μm to far-infrared light. The ZnS crystalline material transmits the light of 0.37 to 14 μm and transmits the visible light and the infrared light like ZnSe. Thus, they are suitable as an optical element for both the visible light and the infrared light. ZnSe and ZnS are compounds of Zn in a group 12 with Se and S, respectively, in a group 16 in the periodic table of the elements, and have the same crystal structure referred to as Zincblende (B3). Thus, both materials can be used for the present embodiment. Relatively and easily available materials obtained by a CVD system as large materials in general for processing the crystalline material of ZnSe or ZnS are polycrystalline materials. In the polycrystalline material, the crystal orientations are not completely uniform, and thus it is difficult to stably obtain a processing property depending on a crystal axis. Thus, it is difficult to obtain a good optical surface from the polycrystalline material. Therefore, it is more desirable to use a single crystal of ZnSe or ZnS.

The processing machine 20 is an ultraprecision cutting processing machine that can perform numerical control (NC) of cutting to a typical resolution in the order of several tens of nanometers (nm). The processing machine 20 forms the grating groove 17 by using a diamond cutting tool 22 that has a sharp tip and produces a processing transcription property with high accuracy as a tool in a shaper (plane shaving) system in which the surface is cut by moving a cutting blade.

In the processing machine 20, the workpiece is mounted on an XY stage composed of an X stage 25 movable in an X direction and a Y stage 26 movable in a Y direction in a highly rigid housing 21, which is resistant to external vibration. The diamond cutting tool 22 is mounted on a Z stage movable in a Z direction. In the present exemplary embodiment, the diamond cutting tool is not rotated, but a processing machine in which the diamond cutting tool is rotated could also be used.

Figure 3:
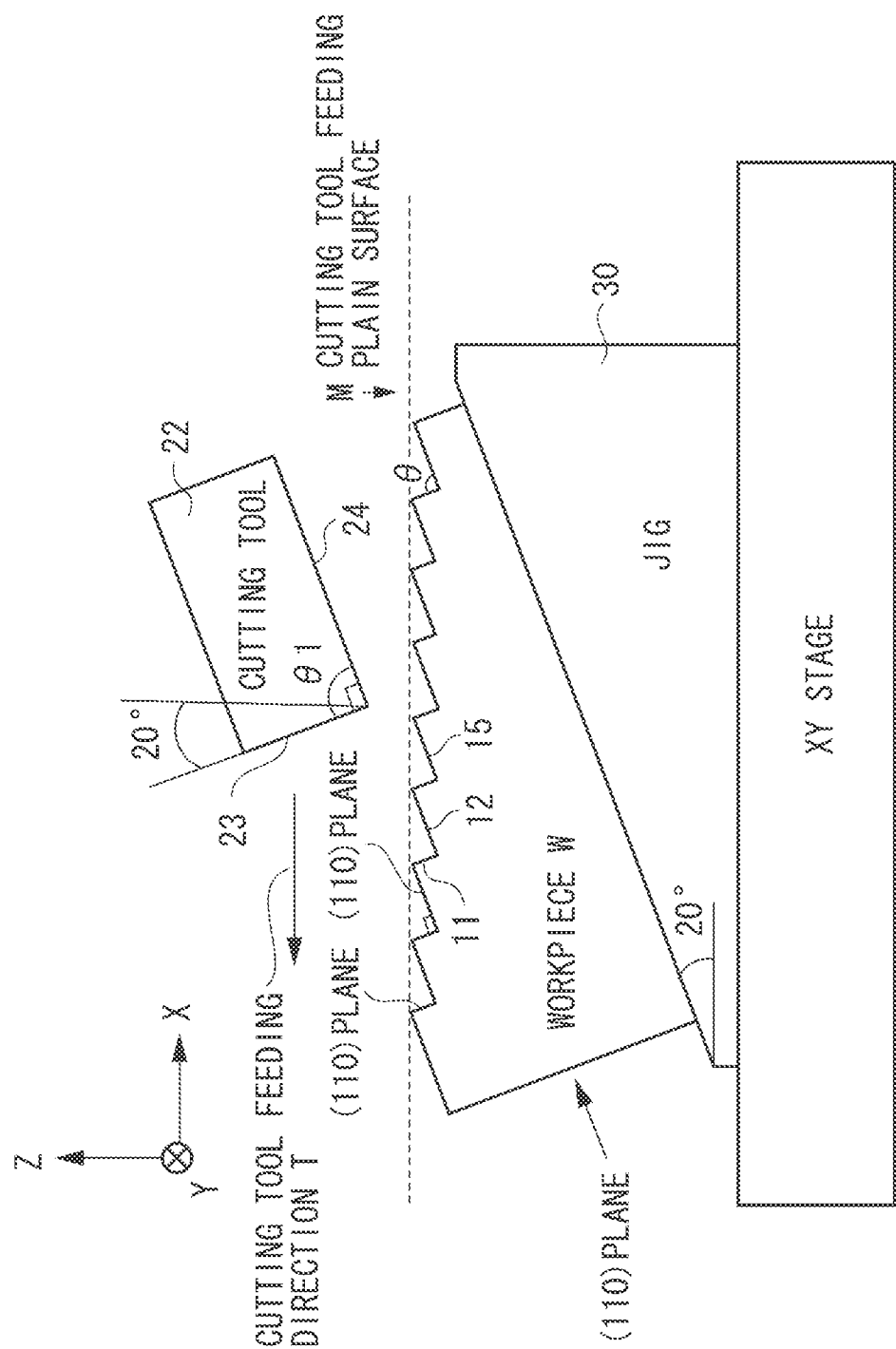
FIG. 3 is a schematic cross-sectional view illustrating a method of manufacturing the blazed diffraction grating illustrated in FIG. 1.

FIG. 3 is a schematic cross-sectional view of the processing machine 20, the workpiece W, and the diamond cutting tool 22. A cutting tool feeding plain surface represented by M is parallel to a brazed direction, which is parallel to a cutting tool feeding direction where the diamond cutting tool 22 is moved relative to the workpiece W.

As illustrated in FIG. 3, the diamond cutting tool has at least two edge cutting blades 23 and 24, which transfer a polygonal groove cross-sectional shape that works as the grating groove 17. An angle θ1 made by tips of the edge cutting blades 23 and 24 is approximately equal to an opening angle θ of the grating groove 17, and is 90° in the present embodiment. A tip portion of the edge cutting blades 23 and 24 is scarcely rounded and a ridgeline accuracy of the edge is very high in the tip portion. Thus, a wall accuracy of the grating groove in the blazed diffraction grating 10 can be made with high precision.

The diamond cutting tool 22 is slid down on a side of the workpiece so that a cutting depth in the Z direction at a position where the diamond cutting tool 22 is located opposite the workpiece W is, for example, 0.2 μm, and the XY stage is moved in the X or Y direction in a linear or curved manner. A cutting rate is obtained by relative movement of the diamond cutting tool 22 and the workpiece W, and the workpiece W is cut and processed with the edge cutting blades 23 and 24.

Of course, a movement target may be a side of the cutting tool or a side of the workpiece in the machining. Also in order to avoid an overload to the cutting tool, the cutting depth required in the Z direction is divided and a step of forming a divided cutting depth may be repeated multiple times. Upon processing, oil mist is sprayed from the rear of a cutting tool rake face to flush cutting chips from the rake face while processing heat is removed.

Hereinafter, the method of manufacturing the diffraction grating using the processing machine 20 will now be described. FIG. 4 is a flowchart illustrating the method of manufacturing (machining) the diffraction grating using the processing machine 20. FIGS. 5A, 5B, 5C, and 5D are schematic cross-sectional views of the workpiece W in respective steps in FIG. 4.

Figure 5A:
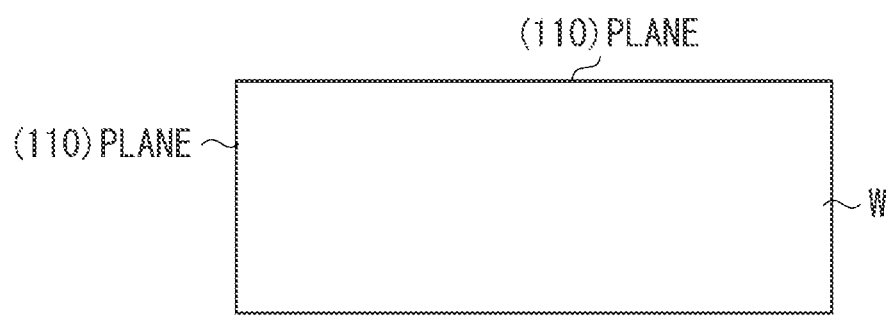
FIGS. 5A, 5B, 5C, and 5D are cross-sectional views of a workpiece in respective steps in FIG. 4.

First, in step S110, a workpiece (work) W made of a crystalline material of ZnSe or ZnS having an appropriate shape such as a cylindrical shape, a cubic shape or a rectangular shape is obtained as illustrated in FIG. 5A. For example, the workpiece W having a cubic shape can be obtained by utilizing a crystal growing apparatus. In the present embodiment, the workpiece W having a rectangular shape in which both an upper surface (upper side end face) and a left side end face are crystal orientation (110) planes is obtained.

Figure 5B:
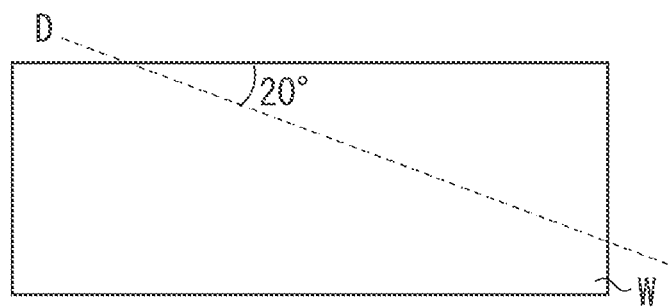

Subsequently, in step S120, the workpiece W obtained in step S110 is cut as illustrated by a dot line D in FIG. 5B. In the present embodiment, a slope angle of this dot line D against the upper surface is 20° as an example. In the present embodiment, a cutting processing machine used in step S120 is not the processing machine 20, and a processing machine with lower accuracy is used.

Figure 5C:
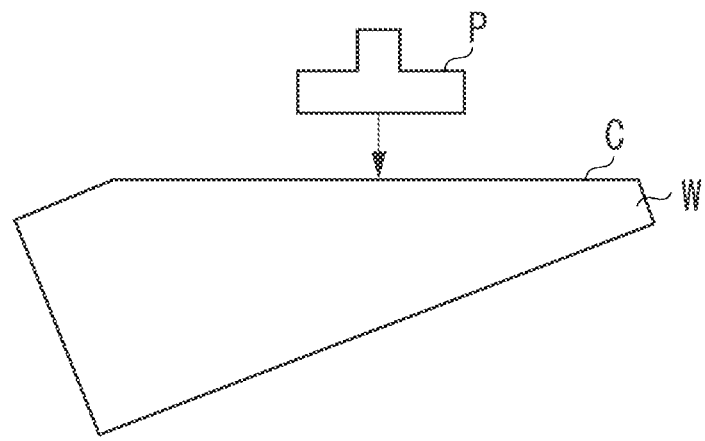

Subsequently, in step S130, the cut surface C of the workpiece W in step S120 is ground using a grinding apparatus P as illustrated in FIG. 5C. In this case, the workpiece W may be placed in the grinding apparatus using a jig 30 to be used in step S140.

Figure 5D:
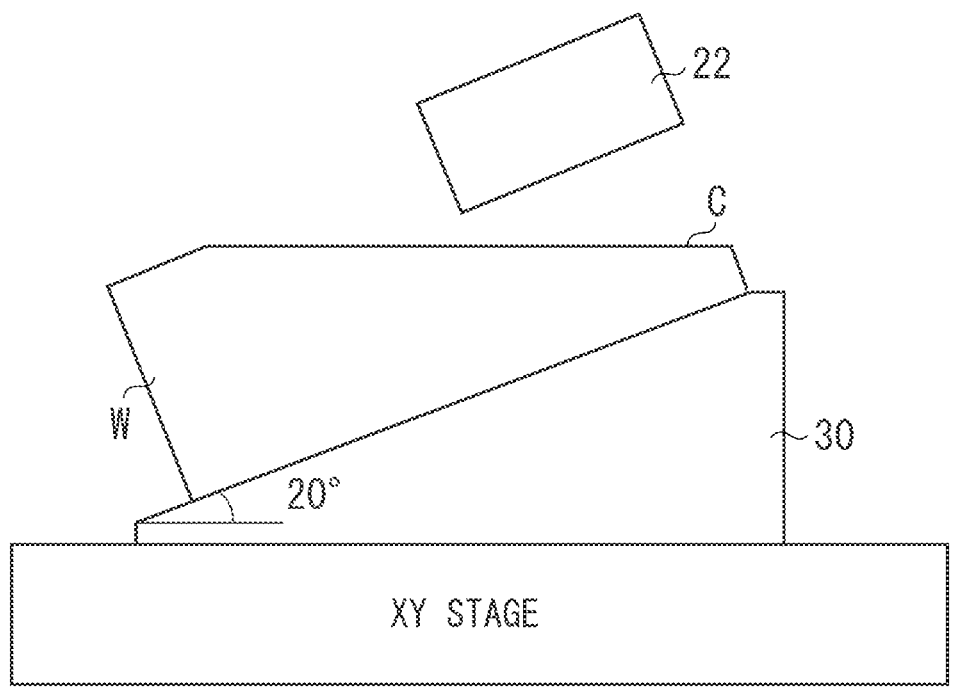

Subsequently, in step S140, the ground workpiece W is placed on the aforementioned XY stage in the processing machine 20 through the jig 30 as illustrated in FIG. 5D. The jig 30 has the slope angle of 20°, and thus the machined surface becomes parallel to the surface of the Y stage 26.

The workpiece W is placed on the jig 30 with a slant to be mounted in the processing machine 20 so that the workpiece has the slope angle of 20 degrees against the cutting tool feeding plain surface M of the processing machine 20. The workpiece is disposed so that the crystal orientation of the cutting tool feeding plain surface M where the cutting tool 22 processes the groove is (Tan θ, 1, 0) (θA=20°). As described above, the shaper system in which the diamond cutting tool 22, which is a tool, is moved in parallel with a distributed orthogonal direction of a diffraction grating groove surface (groove direction) and its shape is transferred is employed in the present embodiment.

Subsequently, in step S150, the machining where the grating groove is formed on a cut surface C of the workpiece W is carried out to obtain a state illustrated in FIG. 3. Step S150 is a step of forming a plurality of grating grooves on the cut surface, which is a surface to be processed. In the present embodiment, when the blazed diffraction grating is manufactured using a crystal of ZnSe or ZnS, the crystal orientation is selected so that a surface including the short side 11 is a (110) plane and the crystal is processed into a thickness equal to or smaller than a critical cutting thickness. This can produce a diffraction element with high quality excellent in profile irregularity by very good process where brittle fracture is minimized compared with the case where the surface including the short side 11 is a plane other than the (110) plane. When the apex angle is 90 degrees, both the surface including the short side 11 and the surface including the long side 12 can be composed of the (110) planes. By minimizing the surface roughness of the surface that forms the grating groove, it is possible to obtain the diffraction element that is advantageous in terms of enhancement of the diffraction efficiency of the diffraction element and reduction of stray light. Put another way, the grating grooves are formed so that the surface that receives the most incident light among the surfaces that constitute each grating is a (110) plane, which is a crystal orientation of the crystalline material.

FIG. 3 shows an embodiment in which the short side 11 and the long side 12 having a slant plane of 20 degrees are processed so that the surface 16 having the short side 11 and the surface 15 having the long side 12 of the blazed diffraction grating 10 of 90 degrees become the (110) planes. By making the cutting thickness 0.2 μm or less upon finish, a good optical surface having the surface roughness of 10 nm or less can be obtained.

Meanwhile, when the crystal orientation is not selected in this way and, for example, the surface 16 having the short side 11 is a (111) plane, even if the cutting thickness upon finish is 0.2 μm or less, the surface roughness is more than 100 nm and a surface accuracy is reduced. Conventionally, the crystal orientation of the cut surface in step S130 was set to be a (111) plane.

It is difficult due to impurities to obtain a perfect crystal, but the crystal orientation in the present embodiment means crystal dominance, and is not limited to a state where all of the orientations are perfectly uniform in the crystal orientations to be evaluated.

When the blazed diffraction grating 10 is used as a reflection diffraction grating, the light enters the grating from a direction that is inclined by a predetermined angle from a grating perpendicular to the blazed direction in FIG. 1. Thus, the incident direction of the light is influenced by the short side 11 and the long side 12. Therefore, in this case, it is desirable to perform machining so that at least one of the short side 11 and the long side 12 is a (110) plane. Of course, when the apex angle 13 is 90°, both the short side 11 and the long side (12) can be set as the (110) plane. In the present embodiment, the diamond cutting tool 22 is used for the machining, but even if a grind stone is used for the cutting process, the surface roughness of the (110) plane can be reduced to be lower than that in other processes of cutting the crystal orientation plane. By incorporating such a diffraction grating into an optical apparatus such as a spectroscope and a laser apparatus, it is possible to manufacture an optical apparatus with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-138391 filed Jun. 20, 2012, which is hereby incorporated by reference herein in its entirety.

What is claimed is:

1. A method for manufacturing a blazed diffraction grating, the method comprising forming the blazed diffraction grating by forming a plurality of grating grooves on a machined surface of a workpiece made of a crystalline material comprising zinc selenide (ZnSe) or zinc sulfide (ZnS) by machining,
wherein the grating grooves are formed to have a triangular cross-section shape, and
wherein the grating grooves are formed so that a surface of a short side of the triangular cross-section shape comprises a (110) plane where (110) corresponds with a crystal orientation of the single crystalline zinc selenide (ZnSe) or the single crystalline zinc sulfide (ZnS).

2. The method according to claim 1, wherein the grating grooves are formed to have an opening angle of 90 degrees.

3. The method according to claim 1, wherein the grating groove is formed using a shaper system having a diamond cutting tool.

4. The method according to claim 1, wherein the blazed diffraction grating is an immersion diffraction grating.

5. The method according to claim 1, wherein the grating groove is formed by mounting the workpiece on a processing machine so that the workpiece is processed to form a surface of each grating groove comprising a (110) plane.

6. A method for manufacturing a blazed diffraction grating, the method comprising forming the blazed diffraction grating by forming a plurality of grating grooves on a machined surface of a workpiece made of single crystalline zinc selenide (ZnSe) or single crystalline zinc sulfide (ZnS) by machining,
wherein the grating groove is formed so that a surface having a short side of a triangular cross-sectional shape of each grating groove is a (110) plane, where (110) corresponds with a crystal orientation of the single crystalline zinc selenide (ZnSe) or the single crystalline zinc sulfide (ZnS).

7. The method according to claim 6, wherein the grating groove is formed so that a surface having a long side of the triangular cross-sectional shape is a (110) plane, where (110) corresponds with a crystal orientation of the single crystalline zinc selenide (ZnSe) or the single crystalline zinc sulfide (ZnS).

8. A method for manufacturing a blazed diffraction grating, the method comprising forming the blazed diffraction grating by forming a plurality of grating grooves on a machined surface of a workpiece made of single crystalline zinc selenide (ZnSe) or single crystalline zinc sulfide (ZnS),
wherein the grating groove is formed so that the grating groove has a triangular cross-section shape that includes two surfaces, and at least one of the two surfaces is a (110) plane, where (110) is a crystal orientation of the single crystalline zinc selenide (ZnSe) or the single crystalline zinc sulfide (ZnS).

9. A blazed diffraction grating made of a single crystalline zinc selenide (ZnSe) or single crystalline zinc sulfide (ZnS), on which a plurality of grating grooves are formed,
wherein the grating groove has a triangular cross-section shape that includes two surfaces, and at least one of the two surfaces is a (110) plane, where (110) corresponds with a crystal orientation of the single crystalline zinc selenide (ZnSe) or the single crystalline zinc sulfide (ZnS).

10. The blazed diffraction grating according to claim 9, wherein the grating groove is includes a blazed plane and a counter plane, and the blazed plane is a (110) plane, where (110) corresponds with a crystal orientation of the single crystalline zinc selenide (ZnSe) or the single crystalline zinc sulfide (ZnS).

11. The blazed diffraction grating according to claim 9, wherein the surface comprising the (110) plane is a surface of a short side of the triangular cross-section shape.

12. The blazed diffraction grating according to claim 9, wherein the blazed diffraction grating diffracts infrared light.

13. The method according to claim 1, wherein a surface roughness of the surface of the short side of the triangular cross-section shape is 10 nm or less.

14. The method according to claim 6, wherein a surface roughness of the surface of the short side of the triangular cross-section shape is 10 nm or less.

15. The method according to claim 8, wherein a surface roughness of the surface of the short side of the triangular cross-section shape is 10 nm or less.

16. The blazed diffraction grating according to claim 9, wherein a surface roughness of the surface, that is a (110) plane, is 10 nm or less.

\* \* \* \* \*